United States Patent [19]

Olson

[11] 4,448,658

[45] May 15, 1984

[54] USE OF HIGH-INTENSITY RAPIDLY-PULSATING ACTINIC RADIATION IN THE CHLORINATION OF POLYVINYL CHLORIDE RESIN

[75] Inventor: Alan J. Olson, Westlake, Ohio

[73] Assignee: The B. F. Goodrich Company, Arkon, Ohio

[21] Appl. No.: 411,161

[22] Filed: Aug. 25, 1982

[51] Int. Cl.$^3$ ............................................. C08F 8/22
[52] U.S. Cl. ............................... 204/159.18; 525/358; 525/331.6
[58] Field of Search ...................... 204/159.18

[56] References Cited

U.S. PATENT DOCUMENTS

| | | | |
|---|---|---|---|
| 2,291,574 | 7/1942 | Gleason | 204/159.18 |
| 2,996,489 | 8/1961 | Dannis et al. | 525/331.6 |
| 3,100,762 | 8/1963 | Schockney | 525/331.6 |
| 3,167,535 | 1/1965 | Gateff et al. | 525/385 |
| 3,334,077 | 8/1967 | Gateff | 525/358 |
| 3,334,078 | 8/1967 | Gateff | 525/358 |
| 3,506,637 | 4/1970 | Makino | 525/331.6 |
| 3,632,848 | 1/1972 | Young et al. | 525/385 |
| 4,167,669 | 9/1979 | Panico | 156/229 |
| 4,412,898 | 11/1983 | Olson et al. | 204/159.18 |

OTHER PUBLICATIONS

Calvert et al., "Photochemistry" Wiley, 1966 pp. 721, 805.

*Primary Examiner*—Melvyn I. Marquis
*Assistant Examiner*—A. H. Koeckert
*Attorney, Agent, or Firm*—James R. Lindsay

[57] ABSTRACT

The present invention pertains to the chlorination of polyvinyl chloride resin particles by exposing said particles of polyvinyl chloride particles while associated with chlorine to high-intensity pulsating actinic radiation.

8 Claims, No Drawings

USE OF HIGH-INTENSITY RAPIDLY-PULSATING ACTINIC RADIATION IN THE CHLORINATION OF POLYVINYL CHLORIDE RESIN

BACKGROUND OF THE INVENTION

Chlorinated polyvinyl chloride resin (CPVC) is a thermoplastic polymer that can be produced by post-chlorinating polyvinyl chloride resin (PVC). It can be processed and formed into various useful articles by conventional techniques, such as milling, calendering, extruding, laminating, compression molding, transfer molding, and the like.

The post-chlorination of polyvinyl chloride resin has been accomplished commercially by forming a suspension of finely-divided PVC particles in an aqueous medium, saturating the aqueous medium with chlorine gas (usually at a temperature no greater than about 65° C.), and, then, photo-illuminating the suspension, with agitation, with a constant source of illumination to induce the chlorination reaction between the dissolved chlorine and suspended PVC particles in the suspension. Additional chlorine gas is fed into the suspension to insure that an excess amount of dissolved chlorine gas always is present in the suspension. The chlorination reaction is terminated when the desired degree of chlorination is achieved by discontinuing the photo-illumination of the suspension. Such a process for chlorinating PVC resin particles is described in U.S. Pat. No. 2,996,489 to Dannis and Ramp, the disclosure thereof being incorporated herein by reference.

U.S. Pat. No. 3,100,762 to Shockney, the disclosure thereof being incorporated herein by reference, discloses that a faster chlorination can be realized by conducting the chlorination at elevated temperatures and pressures in the presence of a swelling agent, but in the absence of photo-illumination. It is taught therein that no catalyst and, particularly, no photo-illumination is required when chlorination is accomplished using a temperature within the range from about 60° C. to about 100° C. and a reactor pressure within the range from about 20 to about 80 psig, if oxygen is substantially excluded from the reactor. It further teaches that inferior chlorinated products are obtained under the aforementioned reaction conditions if the chloromethane swelling agent is omitted from the reaction mixture.

Additional efforts to improve the above-mentioned processes for the chlorination of polyvinyl chloride resin have been made. U.S. Pat. No. 3,506,637, the disclosure thereof being incorporated herein by reference, teaches the use of a specially prepared PVC which is chlorinated in the presence of a controlled supply of oxygen in the absence of swelling agents. As disclosed in U.S. Pat. No. 3,632,848, the disclosure thereof being incorporated herein by reference, the rate of thermal chlorination of an aqueous suspension of PVC is improved when chlorination is initiated at or above 100° C. and below 140° C. while the suspension of PVC is purged with nitrogen to remove oxygen. A process similar to that disclosed in U.S. Pat. No. 2,996,489 is described in U.S. Pat. No. 3,167,535, the disclosure thereof being incorporated herein by reference, with the exception that a catalytic amount of a reducing agent (such as aliphatic and aromatic aldehydes, reducing sugars and alkali metal sulfides) is included in the chlorination reaction. U.S. Pat. No. 3,334,078, the disclosure thereof being incorporated herein by reference, teaches that the addition of a small amount of a colloidal silica or colloidal mineral silicate to the suspension of PVC resin in the aqueous medium containing a chlorohydrocarbon swelling agent prior to the chlorination results in an improved process and a product of improved quality as compared to that resulting when the colloidal silica or mineral silicate is absent. U.S. Pat. No. 3,334,077, the disclosure thereof being incorporated herein by reference, discloses that the addition of a small amount of acrylic acid polymer to the suspension of PVC resin in the aqueous medium containing a chlorohydrocarbon swelling agent prior to the chlorination also is beneficial. It also is known that the chlorination rate can be increased by adding to the PVC/aqueous medium suspension a catalytic amount of a free radical-producing agent, such as, for example, azo compounds, peroxy compounds, peroxides, nitroso compounds, redox catalysts, and the like.

In the copending application of Alan James Olson and Robert Gerard Vielhaber, Ser. No. 350,982, filed Feb. 2, 1982, now U.S. Pat. No. 4,412,898, it is taught that PVC resin in an aqueous suspension can be chlorinated in the absence of any catalyst other than UV light, without the use of swelling agents for the PVC, by initiating chlorination at or below the Tg of the PVC, but preferably above 60° C., and at a pressure above about 15 psig, provided that the reactor is substantially free of molecular oxygen.

As indicated above, it has been the practice commercially to accomplish the chlorination of the PVC resin by exposing the PVC/aqueous suspension to photo-illumination from a constant source of illumination until the desired degree of chlorination is achieved. Various sources of constant illumination have been used, such as ordinary incandescent lamps, mercury vapor or arc lamps, neon glow tubes, carbon arcs and sodium vapor lamps. Commercially, mercury arc lamps generally have been used to initiate the chlorination reaction of PVC. However, when using mercury arc lamps, the amount of UV radiation developed is difficult to control. Further, a mercury arc lamp produces discrete wavelength emmissions of about 253, 310 and 360 nanometers which limits the flexibility of the chlorination. Thus, improvements in the process of post-chlorination of PVC resin still are being sought.

SUMMARY OF THE INVENTION

In accordance with the present invention, chlorination of PVC resin particles is accomplished through use of high-intensity rapidly-pulsating actinic radiation, producing a high quality CPVC product much more efficiently than when using continuous emmission mercury arc lamps. The high-intensity pulsing actinic radiation can be produced by flash tubes known to the art that emit energy over a wavelength spectrum of from about 150 to 1000 nanometers (nm) at pulsations ranging from 1 to 120 pulses per second (pps). The high-intensity pulsed radiation penetrates more effectively into the PVC resin particles, as compared to continuous radiation emitted from mercury arc lamps, whether the particles are suspended in an aqueous medium saturated with chlorine gas or exist as "dry" PVC resin particles in intimate association with liquid or gaseous chlorine, the radiation causing the diatomic chlorine gas to separate into monoatomic chlorine radicals.

DETAILED DESCRIPTION OF THE INVENTION

As mentioned hereinabove, the present invention utilizes high-intensity pulsating radiation in the chlorination of polyvinyl chloride (PVC) resin particles. Although chlorination of the PVC resin particles can be accomplished within the scope of the present invention by illuminating "dry" PVC resin particles in close association with liquid or gaseous chlorine with high-intensity pulsating radiation, desirably the chlorination is carried out by illuminating the PVC resin particles while they are suspended in an aqueous medium saturated with dissolved chlorine and at temperatures between about 10° C. to 120° C. and pressures between 0 and 300 psig.

The polyvinyl chloride resins useful in the process of this invention include thermoplastic polymers produced by the polymerization of a monomer mixture containing not less than about 70% vinyl chloride, more preferably not less than about 90% vinyl chloride. Thus, copolymers and interpolymers of vinyl chloride with minor amounts of 1-monoolefinic or vinyl type (i.e., containing a single $CH_2=C<$ grouping per molecule) comonomers can be utilized. Illustrative comonomers are vinylidene chloride, vinyl acetate, methyl acrylate, styrene, acrylonitrile, methyl methacrylate, ethylene and propylene. However, the homopolymer of vinyl chloride is most preferred.

The PVC resin particles used in this invention desirably are granular and somewhat porous. A macrogranular resin is required to obtain the low slurry viscosity necessary for efficient agitation and to obtain low viscosity at high solids levels when a suspension of PVC resin particles in an aqueus medium is employed. (Vigorous agitation of the suspension slurry facilitates maintaining a high level of chlorine dissolved in the aqueous medium of the slurry and insures that the dissolved chlorine is properly distributed throughout the slurry to be readily available for chlorination of the PVC resin particles.) The term "macrogranular" refers to a granular resin in which essentially all of the particles are greater than about 10 microns ($\mu$) in diameter, more desirably within a range of from about 50$\mu$ to about 500$\mu$ in diameter, and preferably range from about 100$\mu$ to about 200$\mu$ in diameter. General purpose grades of PVC resin obtained by either the mass or suspension polymerization techniques and containing macrogranules within the aforesaid size ranges are suitable for use in the present process. Each macrogranule usually is made up of a multiplicity of primary particles each in the size range from about 0.05 micron to about 5 microns, and more typically in the range from about 0.5 micron to about 2 microns.

The morphology of PVC and CPVC macrogranules, specifically the porosity and surface area, are important properties which determine the physical properties of the polymer after it is molded or otherwise shaped. Most preferred as starting materials are suspension or bulk polymerized PVC resins whose particles have a porosity in the range from about 0.05 cc/g to about 0.50 cc/g, and a surface area in the range from about 1.0 $m^2/g$ to about 3.0 $m^2g$.

The molecular weight of a PVC resin usually is expressed as the intrinsic viscosity of the resin, as determined by the procedure set forth in ASTM Designation D1243. The PVC resins used in the process of the present invention preferably have an intrinsic viscosity in the range from about 0.5 to about 1.4.

When chlorination of the PVC resin is to be accomplished with the PVC resin macrogranules suspended in an aqueous medium containing dissolved chlorine, it has been found that a slurry containing from about 10% to 35% by weight of PVC solids in the suspension desirably is used. If the concentration of PVC resin in the suspension appreciably exceeds 35% by weight, a non-uniform chlorinated product may result. Concentrations of PVC resin below about 10% by weight are not economical. Chlorination usually is carried out in a reactor with chlorine being dissolved in the aqueous medium to furnish the necessary chlorine radicals for chlorinating the PVC resin in the slurry. The gaseous chlorine desirably is charged into a substantially oxygen-free reactor containing the suspension slurry. This may be accomplished merely by purging the reactor with an inert gas, such as nitrogen. The aqueous medium of the slurry is saturated with chlorine gas before chlorination is initiated. An atmosphere containing chlorine gas is maintained in the reactor above the slurry throughout the chlorination process to maintain a sufficient concentration of chlorine dissolved in the aqueous medium of the slurry to insure an adequate supply of chlorine for reaction with the PVC resin.

A process for the chlorination of PVC resin involving mixing PVC resin particles with sufficient liquid chlorine to cause the coating and impregnation of the macrogranules of PVC resin with liquid chlorine, but using an insufficient amount of liquid chlorine to cause a slurry to be formed, followed by exposure of the PVC resin particles to a constant source of ultraviolet light to cause chlorination to occur is described in the copending application of Richard Ghrist Parker, Ser. No. 177,969, filed Aug. 14, 1980, now U.S. Pat. No. 4,377,459, the disclosure thereof being incorporated herein by reference. Use of larger quantities of liquid chlorine sufficient to form a slurry with the PVC resin particles is described in the copending application of Richard Ghrist Parker, Ser. No. 228,538, filed Jan. 26, 1981, now U.S. Pat. No. 4,350,798, the disclosure thereof being incorporated herein by reference. The use of high-intensity pulsing actinic radiation, in place of a constant source ultraviolet light, in the aforementioned liquid chlorination processes also produces advantageous results, as does its use in illuminating a fluid bed of solid PVC resin macrogranules in a gaseous chlorine atmosphere.

The high-intensity pulsating actinic radiation useful in the process of this invention for initiating and continuing the chlorination of the PVC resin particles may be produced in any convenient manner. As indicated above, such pulsating illumination can be produced by flash tubes known to the art that emit energy waves over a wavelength spectrum of from about 150 to 1000 nanometers (nm), preferably from about 200 to 800 nm, at pulsations ranging from about 1 to 120 pulses per second (pps), preferably from about 1 to 60 pps. The pulses desirably have a pulse width of from about $1 \times 10^{-3}$ to $1 \times 10^{-6}$ seconds with the energy of each pulse desirably being from about 50 joules to about 1000 joules. If certain wavelengths of the wavelength spectrum emitted by a particular energy-generating source are undesired for a particular set of operating conditions, the undesired wavelengths can be eliminated or reduced from the illumination used in the chlorination operation through use of appropriate filters. Normally, the flash tubes are filled with an inert gas (such as neon, argon, xenon, etc.) and are connected with a capacitive discharge power supply capable of providing the desired energy pulses to the flash tubes. Preferably, an energy-generating source is used that utilizes one or more xenon-filled flash tubes designed to emit illumination over a continuous wavelength spectrum from about 200 to 800 nm in pulses at the rate of 1 to 60 pps, a pulse width of about $1 \times 10^{-3}$ to $1 \times 10^{-6}$ seconds, and with the energy of each pulse being from about 50 joules to about 1000 joules. Energy-generating equipment using xenon-filled flash tubes suitable for use in the present invention can be obtained from Xenon Corporation of Wilmington, Mass. A type of such apparatus is shown and described in U.S. Pat. No. 4,167,669, the disclosure thereof being incorporated herein by reference.

The chlorination of the PVC resin macrogranules is initiated and the reaction continued by exposing the PVC resin macrogranules to the aforedescribed high-intensity pulsating actinic energy while the PVC granules are associated with chlorine (either as chlorine gas dissolved in the aqueous medium of the PVC/aqueous suspension slurry or in the atmosphere of a fluidized bed of the PVC particles or as liquid chlorine in association with the PVC particles). The high-intensity pulsating actinic energy converts diatonic chlorine molecules to monoatomic chlorine radicals which react with the PVC resin increasing the chlorine content of the polymer until the desired degree of chlorination is obtained. The chlorination period to achieve a resin chlorine content up to about 72% by weight of chlorine using the high-intensity pulsating energy of the present invention can be as low as a few minutes, as compared to several hours when using illumination from a mercury arc lamp. Also, the quantity of energy required for the desired degree of chlorination is significantly reduced when utilizing high-intensity pulsating energy in place of conventional constant emission sources of energy, such as mercury arc lamps. General purpose types of commercially-available polyvinyl chloride resin usually have a resin density of about 1.40 gms/cc at 25° C. and a chlorine content of about 56.7% by weight of chlorine. Following chlorination, CPVC products having a chlorine content of from 61% to 72% (or higher) by weight of chlorine (which equates to resin densities of from about 1.5 to 1.8 gms/cc at 25° C.) readily can be obtained. The chlorination reaction is terminated by discontinuing the exposure of the resin to the high-intensity pulsating energy.

After the chlorination process has been completed, the CPVC resin usually is "neutralized" in order to remove HCl (formed as a by-product of the chlorination) from the resin. When the PVC resin is chlorinated while in a PVC resin/aqueous medium slurry, the slurry (following the chlorination of the PVC resin) normally is filtered or centrifuged to remove liquids from the CPVC resin. Optionally, the wet CPVC resin is washed with water one or more times to remove a substantial amount of the hydrochloric acid solution associated with the CPVC granules. Neutralization of the remaining hydrochloric acid entrapped in the CPVC granules normally is accomplished by treating the CPVC granules with an alkaline solution (for example, an aqueous solution of ammonium, sodium or potassium hydroxide) with agitation. The amount of neutralizer solution used normally will vary from about 1 to 10 parts by weight of solution per 100 parts by weight of CPVC resin and should contain a sufficient amount of basic material to effectively neutralize the hydrochloric acid and provide an essentially neutral pH of about 6.0 to 8.0. The "neutralized" CPVC resin usually then is washed with water to remove essentially all of the basic material from the CPVC resin. The washed CPVC resin is dried, preferably at a temperature below 75° C., in an air or vacuum oven or by any other suitable procedure. One alternative procedure involves washing the water-wetted CPVC resin with alcohol or acetone to displace the water absorbed within the wet CPVC resin and then drying the resin in a vacuum oven at the very moderate temperature of about 50° C.

The following specific examples further illustrate the present invention. It is to be understood, however, that the examples are merely intended as illustrations of the invention and are not intended to limit the scope of the invention. In the examples, all parts and percents are by weight unless otherwise indicated.

EXAMPLE I

A slurry was prepared by mixing together 4887 grams of distilled water and 978 grams of macrogranules of a polyvinyl chloride resin (GEON ® 110×346 produced by The B. F. Goodrich Company, a suspension PVC resin having an intrinsic viscosity of 0.53 and a porosity of 0.09 cc/g). The slurry was charged into a two-gallon, glass-lined, jacketed reactor provided with a mechanical agitator and was heated to 50° C. A vacuum was pulled within the reactor and the slurry was boiled at 50° C. to remove oxygen. Chlorine gas was charged into the reactor as the vacuum was broken until sufficient chlorine gas had been charged into the reactor to maintain a reactor pressure of 48 psia. The reactor was equipped with an external loop which contained a ¾ inch I.D. Pyrex glass tube 24 inches long through which the slurry could be circulated and exposed to illumination. Illumination of the slurry as it passed through the Pyrex glass tube was generated by two 1000-watt pulsating xenon-filled flash tubes (produced by Xenon Corporation of Wilmington, Mass.) which pulsed at 3 pps with an energy output of 144 joules per pulse (equivalent to 864 watts per second). Chlorination rates were determined under stationary state conditions by exposing slurry confined in the Pyrex glass tube to the pulsating illumination discharge of the flash tubes for varying lengths of time. After the chlorination rates were determined, the slurry was circulated continuously through the Pyrex glass tube and exposed to the pulsating illumination to obtain reaction rate data over an extended conversion range. The reaction rate data collected is reported in Table I.

EXAMPLE II

The procedure of Example I was repeated except that the source of illumination was a constant emmission 1200-watt Hanovia high-pressure quartz mercury-vapor lamp. The reaction rate data collected is reported in Table I.

EXAMPLE III

The procedure of Example I was repeated except that the polyvinyl chloride macrogranules (GEON ® 80×6, produced by The B. F. Goodrich Company) were produced by mass polymerization and had an intrinsic viscosity of 0.70 and a porosity of 0.13 cc/g. The reaction rate data collected is reported in Table I.

EXAMPLE IV

The procedure of Example II was repeated using the GEON® 80×6 PVC resin in place of the GEON® 110×346 PVC resin. The reaction rate data collected is reported in Table I.

TABLE I

| Reaction Time (seconds) | Reaction Rate Data Average Reaction Rate (gm $Cl_2$/kg PVC/min.) | | | |
|---|---|---|---|---|
| Ex. | I | II | III | IV |
| 5 (stationary) | 191 | 0 | 109 | 0 |
| 10 (stationary) | 301 | 0 | 187 | 0 |
| 20 (stationary) | 107 | 0 | 112 | 0 |
| 30 (stationary) | — | 0 | — | 0 |
| 60 (stationary) | — | 1.7 | — | 0 |
| $k_c$*(circulating) | 7.04 | 0.45 | 9.59 | 1.25 |

*Average reaction rate during the continuous circulation Period.

EXAMPLES V-VII

Chlorination rates were determined under stationary state conditions using a slurry as described in Example I using varying energy outputs from the xenon-filled flash tubes. The observed chlorination rates are reported in Table II.

TABLE II

| | Chlorine Incorporation Level (gm $Cl_2$/kg PVC) | | |
|---|---|---|---|
| Example | V | VI | VII |
| Reaction Time (seconds) | | | |
| 5 | 6.2 | 10.2 | 17.6 |
| 10 | 13.6 | 14.8 | 25.5 |
| 20 | 18.7 | 24.4 | 33.5 |
| Energy Output (watts) | 256* | 288** | 896*** |

*64 joules per pulse, 2 pulses per second.
**144 joules per pulse, 1 pulse per second.
***64 joules per pulse, 7 pulses per second.

EXAMPLE VIII

A slurry was prepared by mixing together 5450 grams of distilled water and 419 grams of macrogranules of a polyvinyl chloride resin (GEON® 110×368, produced by The B. F. Goodrich Company, a suspension PVC resin having an intrinsic viscosity of 1.15, a porosity of 0.40 cc/g, and a chlorine content of 56.7%). The same apparatus as described in Example I was used except that a ½ inch I.D. Pyrex glass tube 24 inches long was used in place of the ¾ inch I.D. Pyrex glass tube described in Example I. Chlorine gas was charged into the reactor until sufficient chlorine gas had been charged into the reactor to maintain a reactor pressure of 135 psia at 40° C. The xenon-filled flash tubes were pulsed at 7 pps with an energy output of 144 joules per pulse. Chlorination rates were determined under stationary state conditions as in Example I. The chlorination rates obtained are reported in Table III.

TABLE III

| Reaction Time (seconds) | Chlorine Incorporation Level (gm $Cl_2$/kg PVC) | Chlorine Content (%) |
|---|---|---|
| 5 | 56 | 59.2 |
| 20 | 158 | 62.9 |
| 30 | 189 | 63.9 |

As evidenced by the above examples, the use of pulsating high-intensity actinic radiation in the chlorination of polyvinyl chloride resin results in an increased rate of chlorination with an attendant improvement in efficiency.

I claim:

1. The process for chlorinating macrogranules of polyvinyl chloride resin comprising associating said macrogranules of polyvinyl chloride resin with diatomic chlorine and exposing said macrogranules of polyvinyl chloride resin while associated with said diatomic chlorine to high-intensity rapidly-pulsating actinic radiation, said radiation having a wavelength spectrum of from about 150 to 1000 nanometers and pulses at a rate of from about 1 to 120 pulses per second with a pulse width of from $1 \times 10^{-3}$ to $1 \times 10^{-6}$ second and with the energy of each pulse being from about 50 joules to about 1000 joules.

2. The process of claim 1 wherein essentially all of the macrogranules of polyvinyl chloride resin are within a size range of from about 50 microns to about 200 microns in diameter.

3. The process of claim 1 wherein said macrogranules of polyvinyl chloride resin have a porosity in the range of from about 0.05 cc/g to about 0.50 cc/g, a surface area in the range of from about 1.0 $m^2$/g to about 3.0 $m^2$/g, and an intrinsic viscosity in the range from about 0.5 to about 1.4 when measured in accordance with the procedure set forth in ASTM Designation D1243.

4. The process of claim 1 wherein the said radiation has a wavelength spectrum of from about 200 to 800 nanometers and pulses at a rate of from 1 to 60 pulses per second.

5. The process of claim 3 wherein an aqueous slurry of polyvinyl chloride resin particles is formed by mixing together water and said macrogranules of polyvinyl chloride resin until a slurry containing from about 15% to 35% by weight of polyvinyl chloride resin solids in suspension is formed, saturating the aqueous medium of said slurry with gaseous chlorine, and exposing the said aqueous slurry of polyvinyl chloride resin saturated with gaseous chlorine to said high-intensity rapidly-pulsating actinic radiation until the level of chlorination sought is achieved.

6. The process of claim 5 wherein said radiation has a wavelength spectrum of from about 200 to 600 nanometers and pulses at a rate of from about 1 to 60 pulses per second.

7. The process of claim 1 wherein said pulses of actinic radiation are generated using a xenon-filled flash tube.

8. The process of claim 1 wherein from 20 to 100 grams of liquid chlorine are mixed with every 100 grams of said macrogranules of polyvinyl chloride resin and the resulting mixture of macrogranules of polyvinyl chloride resin and liquid chlorine is exposed to said high-intensity rapidly-pulsating actinic radiation.

* * * * *

UNITED STATES PATENT AND TRADEMARK OFFICE
CERTIFICATE OF CORRECTION

PATENT NO. : 4,448,658
DATED : May 15, 1984
INVENTOR(S) : Alan J. Olson

It is certified that error appears in the above-identified patent and that said Letters Patent are hereby corrected as shown below:

Column 8, claim 6, line 54 "600" should be --800--.

Signed and Sealed this

Twelfth Day of February 1985

[SEAL]

Attest:

DONALD J. QUIGG

*Attesting Officer*     *Acting Commissioner of Patents and Trademarks*